ary

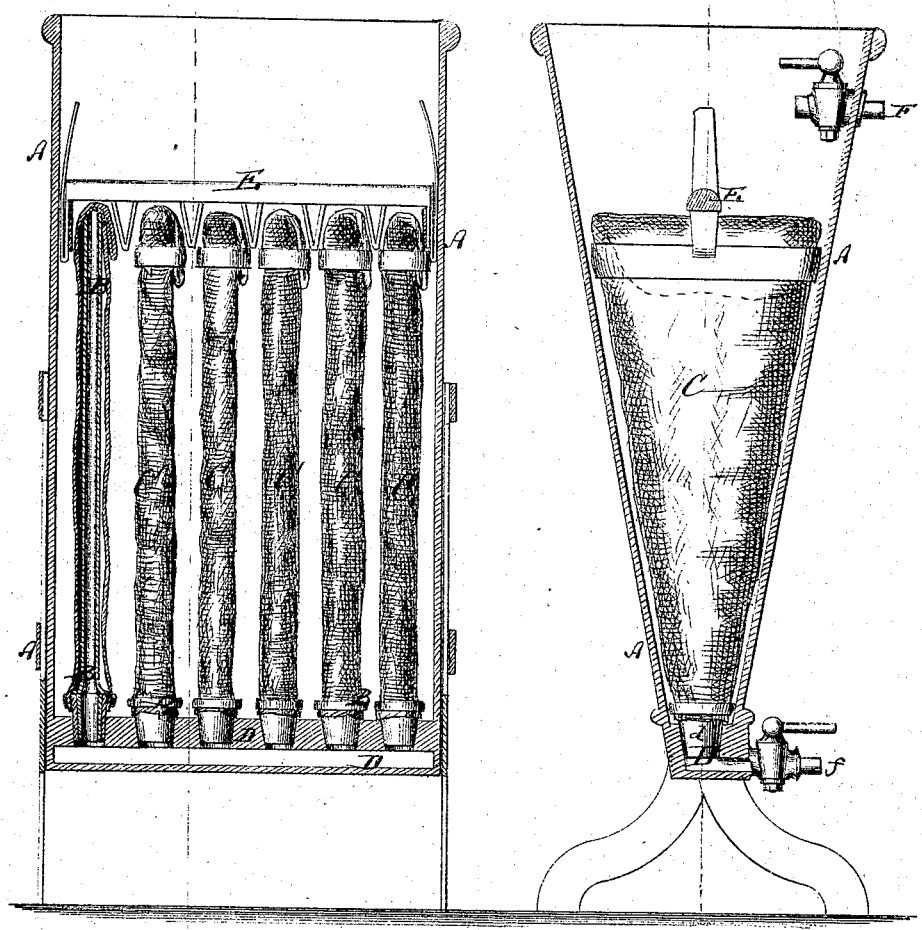
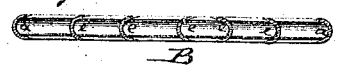
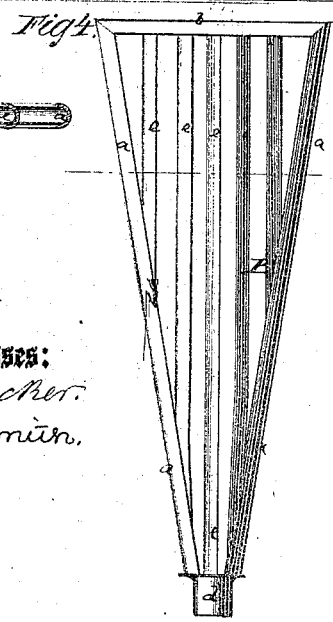

UNITED STATES PATENT OFFICE.

JOHANN P. A. VOLLMAR, OF BINGEN, GERMANY.

IMPROVEMENT IN FILTERS.

Specification forming part of Letters Patent No. 118,306, dated August 22, 1871.

*To all whom it may concern:*

Be it known that I, JOHANN P. A. VOLLMAR, of Bingen, in the Grand Duchy of Hesse Darmstadt, in Germany, have invented a new and Improved Filtering Apparatus; and I do hereby declare that the following is a full, clear, and exact description thereof, which will enable others skilled in the art to make and use the same, reference being had to the accompanying drawing forming part of this specification.

Figure 1 represents a vertical longitudinal section of my improved filtering apparatus. Fig. 2 is a vertical transverse section of the same. Fig. 3 is a horizontal section of one of the filtering-cases. Fig. 4 is a side view of the same. Fig. 5 is a detail central section of the lower discharge-spout.

Similar letters of reference indicate corresponding parts.

This invention relates to a new filtering apparatus, whereby wine or other liquid can be thoroughly cleared in a short space of time and in a continuous stream. The invention consists in the use of tapering frames made of sheet metal, and surrounded with the filtering fabric in such manner that the liquid passing through the large surfaces of the latter will be collected by the converging braces of the frame and caused to enter the discharge-tube.

A in the drawing represents the funnel-shaped vessel, in which my improved apparatus is set up. B B is a series of narrow frames set up therein. Each frame B is made of two side bars, $a\ a$, converging toward the lower end, and braced by a horizontal bar, $b$, at the upper end. A short tube, $d$, is secured to the converging lower ends of the bars $a$. A series of upright parallel bars, $e\ e$, is furthermore arranged within the frame, as is clearly shown in Fig. 4. The several bars $e$ and $a$ are, preferably, made concave in cross-section, as shown in Fig. 3. The tubes at the lower ends of the frames B are inserted within openings of a pipe, D, which is fixed horizontally within the funnel A, and of which the end or a branch, $f$, serves as a discharge-spout for the filter. There is no access to the pipe D from within the filter except through the tubes $d$. Filtering fabrics $c\ c$ are drawn around the several frames B B to properly inclose each separately, and are tied at top and bottom. The upper ends of the frames are held the proper distances apart by a suitable rack, E, secured in the funnel A. F is a pipe entering the upper part of the funnel.

The apparatus is used by putting up sections, as shown, and putting charcoal or other filtering substance around them, filling the funnel therewith to such height as may be needed for the more or less impure liquid. The liquid is then poured in, and runs off through the spout $f$, or, if desired, through the upper pipe F, in case a tube is suspended from the latter into the filter. The several upright braces in the filter serve to collect the filtered liquor and guide it to the discharge-pipe.

Having thus described my invention, I claim as new and desire to secure by Letters Patent—

1. The frames B B, composed of the parts $a\ b$ and $e$ and pipes $d$, substantially as herein set forth and described.

2. The combination of the filtering-vessel A, having the perforated pipe C D, with the frames B, all arranged as set forth.

The above specification of my invention signed by me this 9th day of June, 1871.

J. P. A. VOLLMAR.

Witnesses:
 AARON SEELEY,
 E. HARMS.